United States Patent [19]
Andoh

[11] Patent Number: 5,594,901
[45] Date of Patent: Jan. 14, 1997

[54] CONTROL SYSTEM FOR PARALLEL EXECUTION OF JOB STEPS IN COMPUTER SYSTEM

[75] Inventor: Mitsuru Andoh, Tokyo, Japan

[73] Assignee: NEC Corporation, Tokyo, Japan

[21] Appl. No.: 174,687

[22] Filed: Dec. 28, 1993

[30] Foreign Application Priority Data

Dec. 28, 1992 [JP] Japan .................................. 4-360617

[51] Int. Cl.⁶ ................................................... G06F 13/00
[52] U.S. Cl. ................ 395/674; 395/675; 364/228.7; 364/228.9; 364/230.3; 364/247; 364/DIG. 1
[58] Field of Search .................... 395/650, 800, 395/325, 600; 364/600, 200, DIG. 1, 228.7, 230.3

[56] References Cited

U.S. PATENT DOCUMENTS

| | | | |
|---|---|---|---|
| 4,432,051 | 2/1984 | Bogaert et al. | 364/200 |
| 4,891,787 | 1/1990 | Gifford | 364/600 |
| 5,109,512 | 4/1992 | Bahr et al. | 395/650 |
| 5,165,023 | 11/1992 | Gifford | 395/325 |
| 5,179,702 | 1/1993 | Spix et al. | 395/650 |
| 5,193,186 | 3/1993 | Tamaki et al. | 395/650 |
| 5,313,584 | 5/1994 | Tickner et al. | 395/275 |
| 5,325,525 | 6/1994 | Shan et al. | 395/650 |
| 5,355,508 | 10/1994 | Kan | 395/800 |
| 5,404,520 | 4/1995 | Sonobe | 395/650 |

FOREIGN PATENT DOCUMENTS

| | | |
|---|---|---|
| 62-245361 | 10/1987 | Japan . |
| 63-85855 | 4/1988 | Japan . |
| 2-224169 | 9/1990 | Japan . |

OTHER PUBLICATIONS

IEEE Transactions on Computers, vol. C-31. No.-11, Nov. 1982. Author: Richard E. Buehrer et al.
Title: The ETH Multiprocessor Empress: A Dynomically Configurable MIMD System.

*Primary Examiner*—Kevin A. Kriess
*Assistant Examiner*—Majid A. Banankhah
*Attorney, Agent, or Firm*—Foley & Lardner

[57] ABSTRACT

A job step parallel execution control system in a computer system has a job control statement which can designate whether a job step is to be executed by a specifically designated host computer or by an arbitrarily selected host computer, whether parallel execution of the job step while another job step in the same job is in execution, and/or whether the job is to be continued, to be forcedly terminated or to be terminated after termination of the other job step of the job currently in execution, upon commanding execution of the job step. Upon execution of the job, the job control statement is sequentially decoded to efficiently control parallel execution and termination of execution of the job step.

17 Claims, 11 Drawing Sheets

FIG. 5

| DESIGNATION OF PARALLEL EXECUTION OF JOB | |
|---|---|
| $ STEP  EXECUTED PROGRAM NAME  PARALLEL EXECUTION DESIGNATION | |
| (EXAMPLE OF DESIGNATION) | |
| · $ STEP  EXECUTED PROGRAM NAME  PARALLEL = YES ; | |

FIG. 6

OPERATION DESIGNATION UPON TERMINATION OF JOB STEP EXECUTION $WHEN STATUS {EQ / NE} {NORMAL / ABNORMAL} JUMP {NEXT / ENDJOB}
  → {DESIGNATION FOR WAITING / DESIGNATION FOR FORCED TERMINATION}

(EXAMPLE OF DESIGNATION)

- $ WHEN STATUS EQ ABNORMAL JUMP NEXT ;
  (CONTINUE JOB BY EXECUTING NEXT JOB STEP EVEN AT ABNORMAL TERMINATION OF JOB STEP)

- $ WHEN STATUS EQ ABNORMAL JUMP ENDJOB WAIT ;
  (TERMINATE JOB UPON ABNORMAL TERMINATION OF JOB STEP (WAIT FOR OTHER JOB STEP))

- $ WHEN STATUS EQ ABNORMAL JUMP ENDJOB IMMEDIATE ;
  (TERMINATE JOB AFTER FORCEDLY TERMINATING OTHER JOB STEPS UPON ABNORMAL TERMINATION OF JOB STEP)

FIG. 7

OTHER HOST EXECUTION DESIGNATION

$ STEP   EXECUTED PROGRAM NAME   EXECUTING HOST DESIGNATION (EXAMPLE OF DESIGNATION)

• $ STEP   EXECUTED PROGRAM NAME   SYSTEM = HOST1 ;

(DESIGNATION FOR EXECUTION BY HOST DEFINED BY HOST NAME "HOST1")

• $ STEP   EXECUTED PROGRAM NAME   SYSTEM = GLOBAL ;

(DESIGNATION FOR EXECUTION BY ARBITRARILY SELECTED HOST)

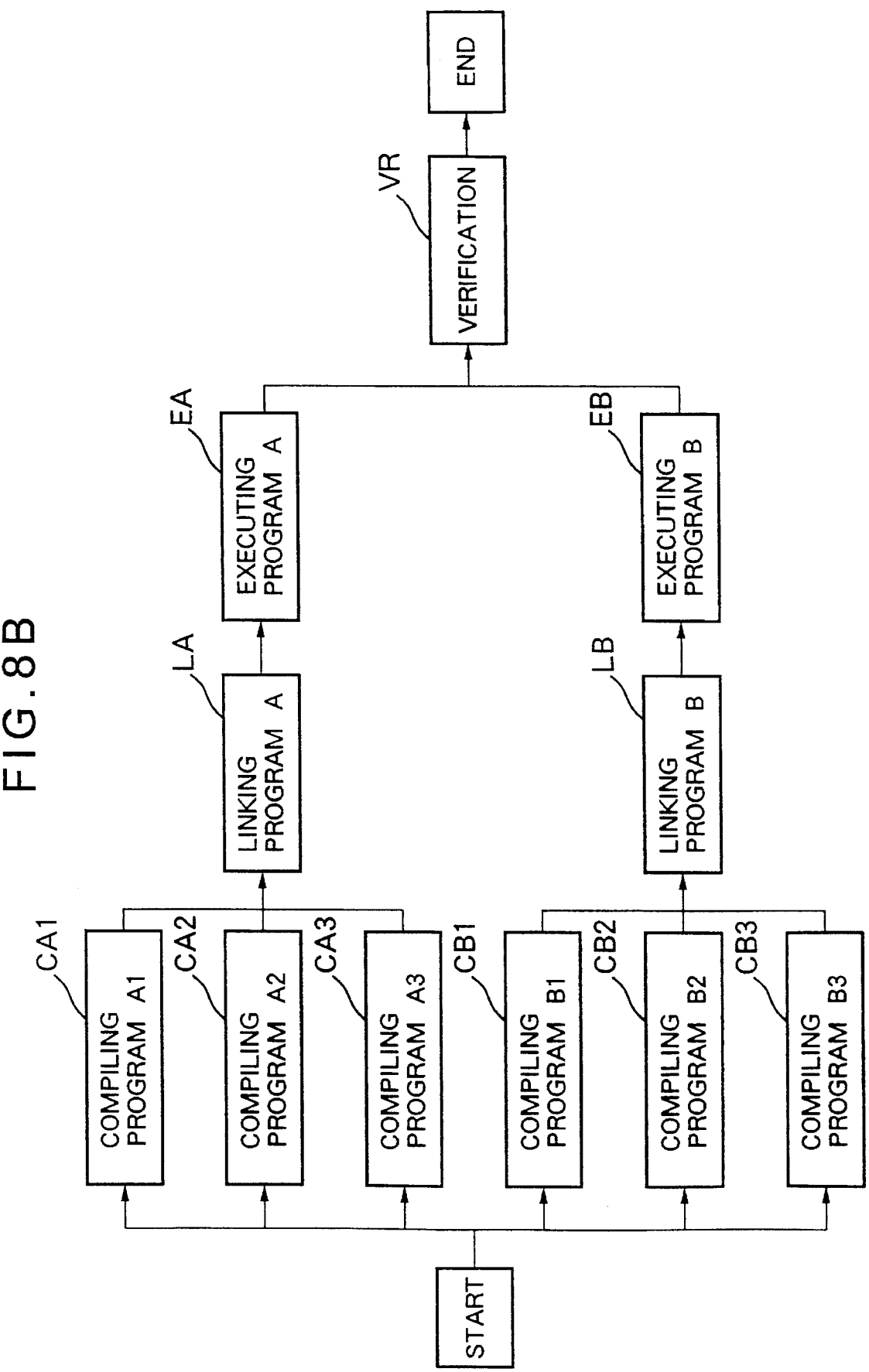

CONTROL SYSTEM FOR PARALLEL EXECUTION OF JOB STEPS IN COMPUTER SYSTEM

BACKGROUND OF THE INVENTION

1. Field of the Invention

The present invention relates generally to a parallel execution system for job steps in a computer system. More specifically, the invention relates to a job steps parallel execution system for a computer system which is constituted of one or more host computers.

2. Description of the Related Art

In the recent years, computer systems are growing to have greater scale and wider varieties. Accordingly, constructions of host computers constituting the computer system and utilities of the jobs are becoming more and more complicated. The conventional multi-programming is intended to efficiently use the performances of central processing units (CPUs) and input/output devices of the host computer to improve the throughput of the computer system. This can be achieved by executing a plurality of jobs simultaneously or by modifying specific programs for multi-task operation.

On the other hand, in case of the computer system constituted by a plurality of host computers, the processes required for the computer system can be distributed to a plurality of host computers so as to reduce the load on each individual computer. By distribution of the processes, processing performance of the overall computer system is improved and whereby the turn around period can be improved. Furthermore, special resources, such as a high speed arithmetic feature owned by a specific host computer among a plurality of host computers can be effectively used.

One example of the conventional load distribution type computer system constituted by a plurality of host computers has been disclosed in Japanese Unexamined Patent Publication No. 62-245361. The load distribution system disclosed in the above-identified publication makes analysis of load conditions of respective host computers so that a job is transferred to the host computer having low load.

Another example of the conventional load distribution type computer system is disclosed in Japanese Unexamined Patent Publication No. 2-224169. In the load distribution system disclosed in the above identified publication, the computer system automatically divides a specific program into tasks and selects computers having lower load to execute the task.

A still further conventional load distribution type computer system which is constituted by a plurality of host computer and uses specific resources of a specific computer, is disclosed in Japanese Unexamined Patent Publication No. 63-85855. The disclosed load distribution type computer system utilizing the specific computer generates a job to be executed by another computer for a specific job step utilizes other specific computer having the specific resource, and returns to the original job after completion of the generated job.

As set forth above, multi-programming in the single computer is conventionally performed by executing a plurality of jobs simultaneously and by effecting multi-task operation with the specific program. When a process is to be executed, including an aggregate of job steps not depending upon the process and having one object through overall steps, there are only ways to sequentially execute the steps as one job, to execute them as a job network with a plurality of jobs by dividing the steps not depending upon the process as mutually independent plurality of jobs, or to sequentially execute them by manually synchronizing jobs.

When a process is to be executed, the process including an aggregate of job steps not depending upon the process and having one object through overall steps, a job control statement for controlling execution of the job becomes complicated when handling problems so as to make management, such as modification, correction and so forth cumbersome.

On the other hand, even in the conventional load distribution system in the computer system comprising a plurality of host computers, it is not possible to execute a plurality of steps in the process including an aggregate of job steps not depending upon the process and having one object through overall steps, simultaneously by a plurality of host computers. Therefore, it is a typical approach to execute per jobs by assigning respective unit jobs to the host computers forming the computer system or to execute them by dividing the steps not depending upon the process into a plurality of mutually independent jobs and by assigning respective job to a plurality of host computers. Namely, it has not been possible to execute a plurality of steps of a single job with a plurality of host computers.

Furthermore, when the process is executed by dividing the steps not depending upon the process into a plurality of independent jobs and assigning the divided plurality of jobs to a plurality of host computers, even if the executed step is abnormally terminated, other steps which are simultaneously executed cannot be stopped as no co-relation is established between the jobs. This continues unnecessary execution of the other simultaneously executed steps, which causes wasting of resources.

SUMMARY OF THE INVENTION

Therefore, it is a first object of the present invention to provide a job step parallel execution control system which permits simultaneous execution of a plurality of steps of a single job by permitting designation in an execution command of a job control statement whether parallel execution of one step while another step in the same job is in execution is possible or not.

A second object of the invention is to provide a job step parallel execution control system which permits continuing execution of a job, forced execution termination of the job or termination the job upon completion of other steps of the job in execution when a certain step is terminated abnormally during simultaneous execution of a plurality of steps of the single job, by permitting designation for operation to continuing execution of job, in the execution command of the steps in the job control statement, forced execution termination of the job or termination of the job upon completion of other steps of the job in execution when the own step is terminated abnormally.

A third object of the present invention is to provide a job step parallel execution control system which permits simultaneous execution of a plurality of steps of a single job by permitting designation in an execution command of a job control statement whether parallel execution of one step while another step in the same job is in execution is possible or not, and permits continuation of execution of a job, forced execution termination of the job or termination of the job upon completion of other steps of the job in execution when a certain step is terminated abnormally during simultaneous execution of a plurality of steps of the single job, by permitting designation for operation for continuing execution of job, in the execution command of the steps in the job control statement, forced execution termination of the job or termination of the job upon completion of other steps of the job in execution when the own step is terminated abnormally.

A fourth object of the invention is to provide a job step parallel execution control system which permits simultaneous execution of a plurality steps in the single job and execution of a plurality of simultaneously executed steps with specific or arbitrary computers in a computer system comprising a plurality of computers, by permitting designation of whether parallel execution of the one step while another step in the same job in execution is possible or not and designation whether the one step is to be executed and by the specific computer or an arbitrarily selected computer, in the execution command for the step in the job control statement.

A fifth object of the invention is to provide a job step parallel execution control system which permits execution of a plurality of simultaneously executed steps with specific or arbitrary computers in a computer system comprising a plurality of computers by permitting designation of whether the one step is to be executed by the specific computer or an arbitrarily selected computer, in the execution command for the step in the job control statement, and which further permits continuation of execution of a job, forced execution termination of the job or termination of the job upon completion of other steps of the job in execution when a certain step is terminated abnormally during simultaneous execution of a plurality of steps of the single job, by permitting designation for operation to continue execution of job, in the execution command of the steps in the job control statement, to forcedly terminate execution of the job or to terminate the job upon completion of other steps of the job in execution when the own step is terminated abnormally.

A sixth object of the invention is to provide a job step parallel execution control system which permits simultaneous execution of a plurality of steps of a single job by permitting designation in an execution command of a job control statement whether parallel execution of one step while another step in the same job is in execution is possible or not, which also permits continuation of execution of a job, to forcedly terminate execution of the job or to terminate the job upon completion of other steps of the job in execution when a certain step is terminated abnormally during simultaneous execution of a plurality of steps of the single job, by permitting designation for operation to continue execution of job, in the execution command of the steps in the job control statement, to forcedly terminate execution of the job or to terminate the job upon completion of other steps of the job in execution when the own step is terminated abnormally, and which further permits execution of a plurality of simultaneously executed steps with specific or arbitrary computers in a computer system comprising a plurality of computers by the specific computer or arbitrary selected computer, in the execution command for the step in the job control statement.

According to the first aspect of the invention, a job step parallel execution control system in a computer system comprises an information storage means for storing information of a job and job steps in execution. There is also a job controlling means for describing the content of operation control of the job by a job control language in a form of a job control statement which can designate whether a parallel execution during execution of other job step in the same job is permitted or not upon commanding execution of the job step.

There is a job control statement translating means for sequentially decoding the job control statement corresponding the job to be executed. Also, there is a job step execution commanding means for commanding execution of the job step upon detecting of a job step execution command through decoding by the job control statement translating means when no job step in the same job is in execution or when the job step execution command contains the designation for parallel execution. A job step executing means is responsive to the job step execution command for initiating and executing a program designated by the job step execution command as an executed job step.

The job step execution commanding means may comprise:

means for making judgement whether other job step in the job is in execution or not by making reference to the information storage means storing the information of the job and the job steps when the execution command of the job step of the job is detected through decoding by the job control statement;

means for making judgement whether the job step execution command contains the designation for parallel execution of the job step; and means for adding information of newly executed job step in the information storage means.

In the preferred construction the job step parallel execution control system may further comprise:

means for containing a designation in the job step execution command in the job control statement whether the job is to be continued, the job is to be forcedly terminated or the job is terminated after termination of execution of other job step in the job upon abnormal termination of the job step;

job step termination receiving means for receiving information indicative of termination of the job step upon termination of the job step which is executed;

termination processing means for making judgement for termination of the job step received by the job step termination receiving means and terminating the job according to the content of designation in the job control statement when the job step termination state is abnormal termination;

forced termination commanding means for commanding forced termination of other job step in execution when the process the termination processing means of forced termination of the job; and forced termination means for forcedly terminating other job step in execution according to the forced termination command for the job step.

According to a second aspect of the invention, a job step parallel execution control system in a computer system comprises:

information storage means for storing information of a job and job steps in execution;

job controlling means for describing content of operation control of the job by a job control language in a form of a job control statement which can designate whether the job is to be continued, the job is to be forcedly terminated or the job is terminated after termination of execution of other job step in the job upon abnormal termination of the job step;

job control statement translating means for sequentially decoding the job control statement corresponding the job to be executed;

job step termination receiving means for receiving information indicative of termination of the job step upon termination of the job step which is executed;

termination processing means for making judgement for termination of the job step received by the job step termination receiving means and terminating the job according to the content of designation in the job control statement when the job step termination state is abnormal termination;

forced termination commanding means for commanding forced termination of other job step in execution when the process the termination processing means of forced termination of the job; and forced termination means for forcedly terminating other job step in execution according to the forced termination command for the job step.

According to a third aspect of the invention, a job step parallel execution control system in a computer system including a plurality of host computers, comprises:

information storage means for storing information of a job and job steps in execution;

job controlling means for describing content of operation control of the job by a job control language in a form of a job control statement which can designate whether the job step is to be executed by a specific host computer or by an arbitrarily selected host computer, and whether a parallel execution during execution of other job step in the same job is permitted or not upon commanding execution of the job step;

job control statement translating means for sequentially decoding the job control statement corresponding the job to be executed;

job step execution commanding means for commanding execution of the job step on the arbitrarily selected host computer according to the execution command or on the host computer designated by the execution command upon detecting of a job step execution command through decoding by the job control statement translating means when no job step in the same job is in execution or when the job step execution command contains the designation for parallel execution; and job step executing means responsive to the job step execution command for initiating and executing a program designated by the job step execution command as an executed job step.

The job step executing means may comprise:

means for making judgement whether the host computer available for execution of the job step with reference to the information of the job and the job step stored in the information storage means and determining the host computer for executing the job step, when designation in the job step execution command is execution by the arbitrarily selected host computer;

means for making judgement whether the designated host computer is available for execution of the job step with reference to the information of the job and the job step stored in the information storage means when the designation in the job step execution command is execution by the designated host computer;

means for waiting termination of execution of other job step when no host computer is available for execution or while the available host computer is present, other job step of the job is in execution on the available host computer and the designation for parallel execution is absent; and means for adding information of the executed job step and information indicative of waiting state of termination of execution of other job step.

Preferably, the job step parallel execution control system further comprises commanding means for commanding execution of the job step for other host computer when the host computer arbitrarily selected according to the execution command or the host computer designated by the execution command determined by the own host computer executing the job is other than the own computer executing the job; and execution command receiving means provided in the host computer other than the own computer executing the job for receiving the job step execution command from the commanding means.

The job step commanding means may comprise:

means for making judgement whether other step in the job is in execution or not with reference to the information concerning the job and the job steps stored in the information storage means; and means for making judgement whether the designation for parallel execution is contained in the execution command for the job step when other job step is in execution.

According to a fourth aspect of the invention, a job step parallel execution control system in a computer system including a plurality of host computers, comprises:

information storage means for storing information of a job and job steps in execution;

job controlling means for describing content of operation control of the job by a job control language in a form of a job control statement which can designate whether the job step is to be executed by a specific host computer or by an arbitrarily selected host computer, and whether the job is to be continued, the job is to be forcedly terminated or the job is terminated after termination of execution of other job step in the job upon abnormal termination of the job step;

job control statement translating means for sequentially decoding the job control statement corresponding the job to be executed;

job step execution commanding means for commanding execution of the job step on the arbitrarily selected host computer according to the execution command or on the host computer designated by the execution command upon detecting of a job step execution command through decoding by the job control statement translating means; and job step executing means responsive to the job step execution command for initiating and executing a program designated by the job step execution command as an executed job step;

job step termination receiving means for receiving information indicative of termination of the job step upon termination of the job step which is executed;

termination processing means for making judgement for termination of the job step received by the job step termination receiving means and terminating the job according to the content of designation in the job control statement when the job step termination state is abnormal termination;

forced termination commanding means for commanding forced termination of other job step in execution when the process the termination processing means of forced termination of the job; and forced termination means for forcedly terminating other job step in execution according to the forced termination command for the job step.

In this case, the system may further comprise:

termination notifying means included in the host computer other than own host computer commanding execution of the job step for notifying the termination and the terminating condition of the job step received by the job step termination receiving means to the host computer which commanded execution of the job step; and receiving means included in the own host computer commanding the execution of the job step for receiving the notice from the termination notifying means.

Also, the system may further comprise:

other host termination commanding means included in the own host computer commanding execution of the job step for commanding forced termination of the job step for the other host computer which is commanded execution of the job step, when the job step for which the forced termination is commanded by the forced termination commanding means is in execution by the host computer other than the own host computer commanding execution of the job step; and receiving means included in the other host computer for receiving the forced termination command from the other host forced termination commanding means.

According to the fifth aspect of the invention, a job step parallel execution control system in a computer system including a plurality of host computers, comprises:

information storage means for storing information of a job and job steps in execution;

job controlling means for describing content of operation control of the job by a job control language in a form of a job control statement which can designate whether the job step is to be executed by a specific host computer or by an arbitrarily selected host computer, whether a parallel execution during execution of other job step in the same job is permitted or not upon commanding execution of the job step, and whether the job is to be continued, the job is to be forcedly terminated or the job is terminated after termination of execution of other job step in the job upon abnormal termination of the job step;

job control statement translating means for sequentially decoding the job control statement corresponding the job to be executed;

job step execution commanding means for commanding execution of the job step on the arbitrarily selected host computer according to the execution command or on the host computer designated by the execution command upon detecting of a job step execution command through decoding by the job control statement translating means when no job step in the same job is in execution or when the job step execution command contains the designation for parallel execution; and job step executing means responsive to the job step execution command for initiating and executing a program designated by the job step execution command as an executed job step;

job step termination receiving means for receiving information indicative of termination of the job step upon termination of the job step which is executed;

termination processing means for making judgement for termination of the job step received by the job step termination receiving means and terminating the job according to the content of designation in the job control statement when the job step termination state is abnormal termination;

forced termination commanding means for commanding forced termination of other job step in execution when the process the termination processing means of forced termination of the job; and forced termination means for forcedly terminating other job step in execution according to the forced termination command for the job step.

The system may further comprise:

termination notifying means included in the host computer other than own host computer commanding execution of the job step for notifying the termination and the terminating condition of the job step received by the job step termination receiving means to the host computer which commanded execution of the job step; and receiving means included in the own host computer commanding the execution of the job step for receiving the notice from the termination notifying means.

Also, the system may further comprise:

other host termination commanding means included in the own host computer commanding execution of the job step for commanding forced termination of the job step for the other host computer which is commanded execution of the job step, when the job step for which the forced termination is commanded by the forced termination commanding means is in execution by the host computer other than the own host computer commanding execution of the job step; and receiving means included in the other host computer for receiving the forced termination command from the other host forced termination commanding means.

The job step executing means may comprise:

means for making judgement whether the host computer available for execution of the job step with reference to the information of the job and the job step stored in the information storage means and determining the host computer for executing the job step, when designation in the job step execution command is execution by the arbitrarily selected host computer;

means for making judgement whether the designated host computer is available for execution of the job step with reference to the information of the job and the job step stored in the information storage means when the designation in the job step execution command is execution by the designated host computer;

means for waiting termination of execution of other job step when no host computer is available for execution or while the available host computer is present, other job step of the job is in execution on the available host computer and the designation for parallel execution is absent; and means for adding information of the executed job step and information indicative of waiting state of termination of execution of other job step.

The system may further comprise:

commanding means for commanding execution of the job step for other host computer when the host computer arbitrarily selected according to the execution command or the host computer designated by the execution command determined by the own host computer executing the job is other than the own computer executing the job; and execution command receiving means provided in the host computer other than the own computer executing the job for receiving the job step execution command from the commanding means.

The job step commanding means may comprise:

means for making judgement whether other step in the job is in execution or not with reference to the information concerning the job and the job steps stored in the information storage means; and means for making judgement whether the designation for parallel execution is contained in the execution command for the job step when other job step is in execution. Other objects, feature and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 5 is an illustration showing an example of a parallel execution method of a job in a job control statement in FIG. 1;

FIG. 6 is an illustration showing an example of a method for designation of execution by other host computer in the job control statement in FIG. 1;

FIG. 7 is an illustration showing an example of an operation designation method upon termination of execution of the job step in the job control statement in FIG. 1;

FIG. 8B is an illustration showing an example of an operation of the Job step, for which the job step parallel execution system of the present invention is applied.

DESCRIPTION OF THE PREFERRED EMBODIMENT

Figure 1:
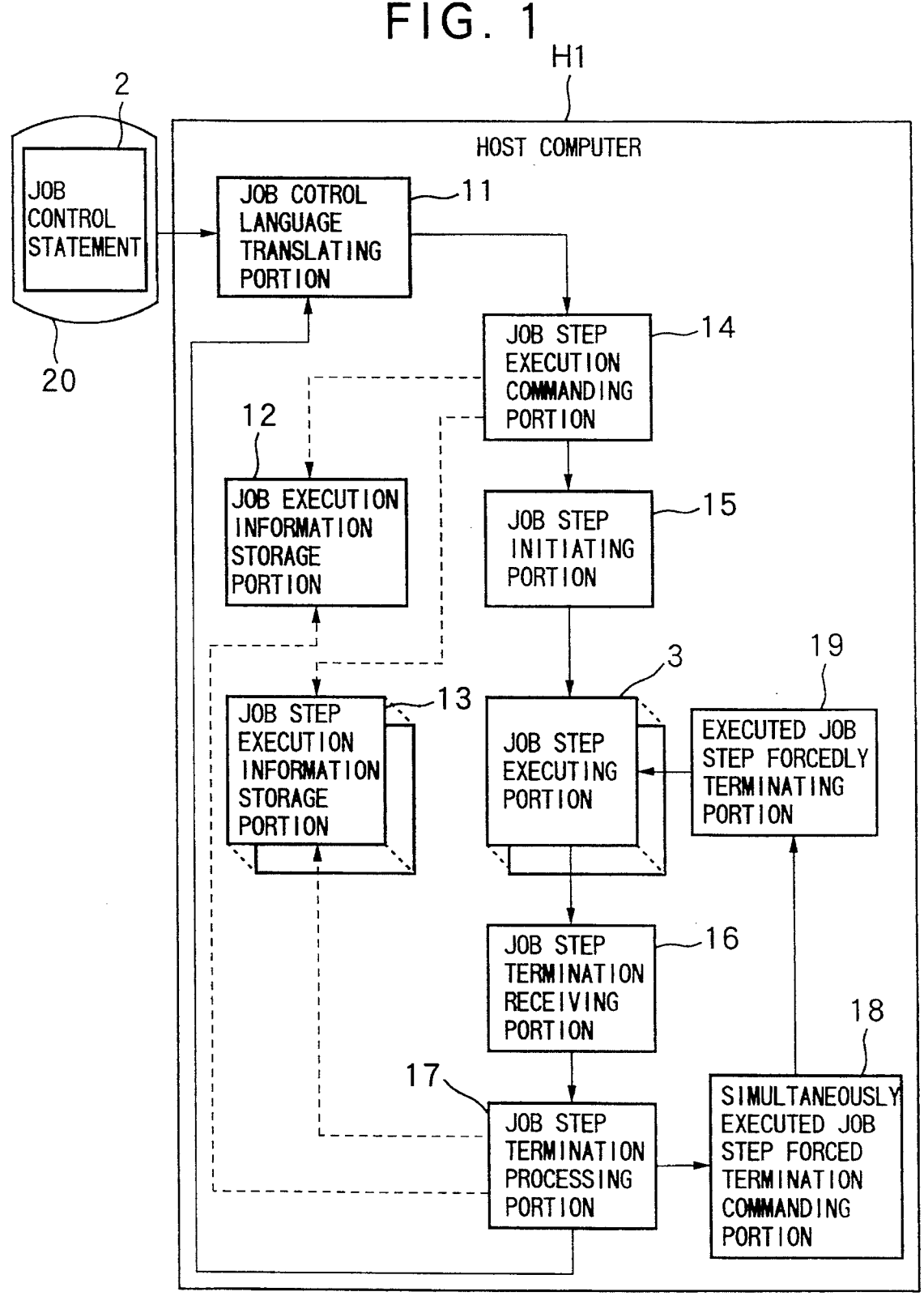
FIG. 1 is a block diagram showing a computer system comprising a single host computer, to which one embodiment of a job step control system according to the present invention is applied.

The preferred embodiment of a job step parallel execution control system according to the present invention will be discussed hereinafter with reference to the accompanying drawings. FIG. 1 is a block diagram showing a construction of a computer system, to which the first embodiment of a job step parallel execution control system according to the present invention is applied. The computer system comprises a host computer H1 and a storage device 20 connected to the host computer H1 and storing a job control statements 2 written by a job control language for controlling execution of a job input to the computer system. The job control language defines control commands for controlling execution of the job. Among the job control language, a job step execution command permits designation whether parallel execution of the own job step can be executed while other step in the same job is already executed, as shown in FIG. 5. In FIG. 5, when execution is commanded for a job step permitting parallel execution while another job step in the common job is already executed, designation is made such as "PARALLEL=YES". On the other hand, when the parallel execution is not permitted, designation is made such as "PARALLEL=NO".

Also, the step execution command in the job control statement may include designation to continue the job, to forcedly terminate the job or to terminate the job after compression of other step in the common job, when the execution of the step is terminated abnormally, as shown in FIG. 6. In FIG. 6, "STATUS" represents a job step terminating state, "EQ" represents equal, "NE" represents not equal. Also, "NEXT" represents the continuation of the job, "ENDJOB" represents termination of the job. "WAIT AND TERMINATE DESIGNATION" and "FORCED TERMINATION DESIGNATION" represent termination method of the job.

The host computer H1 comprises a plurality of job step executing portions 3, a job control language translating portion 11, a job execution information storage portion 12, a plurality of job step execution information storage portion 13, a step execution commanding portion 14, a step initiating portion 15, a step termination receiving portion 16, a step termination processing portion 17, a simultaneously executed job steps forced termination commanding portion 18 and an executed job step forced terminating portion 19.

The job control language translating portion 11 sequentially decodes the job control statement 2 for the job upon execution of the job applied to the computer system. The job execution information storage portion 12 stores an execution information of the job currently executed in the host computer H1. The job step execution information storage portion 13 stores job step information currently executed by the host computer H1.

The job step execution commanding portion 14 checks whether other job step of the common job is already in execution with reference to the job execution information stored in the job execution information storage portion 12 and the job step execution information stored in the job step execution information storage portion 13 when the job step execution command is detected by the job control language translating portion 11. When other job step in execution is not present or if the job step execution command detected by the job control language translating portion 11 contains a designation for the job step parallel execution even when other step in execution is present, the job step execution commanding portion 14 commands execution of the job step to the job step initiating portion 15. Then, the job step execution commanding portion 14 adds the information of the job to be newly executed to the job execution information storage portion 12 and the job step execution information storage portion 13.

The step initiating portion 15 triggers the job step executing portion 3 to executed the job or program designated by the job step execution command detected by the job control language translating portion 11. The job step termination receiving portion 16 receives information indicative of termination of the job step and the terminating condition upon termination of execution by the job step executing portion 3.

The job step termination processing portion 17 checks the terminating condition of the job step executing portion 3 received by the job step termination receiving portion 16. When the job step terminating condition is abnormal termination, the job step termination processing portion 17 continues the job, forcedly terminates the job or terminates the job after termination of other job step of the common job according to designation of operation upon abnormal termination contained in the job step execution command detected by the job control language translating portion 11.

The simultaneously executing job steps forced termination commanding portion 18 issues forced termination command for other job step in execution to the executing job step forcedly terminating portion 19 when other job step in execution is present in the same job upon forced termination of the job by the job step termination processing portion 17. The executing job step forcedly terminating portion 18 is responsive to the executing job step forced termination command from the simultaneously executed job step forced termination commanding portion 18 to forcedly terminate other job steps in execution.

Figure 3A:
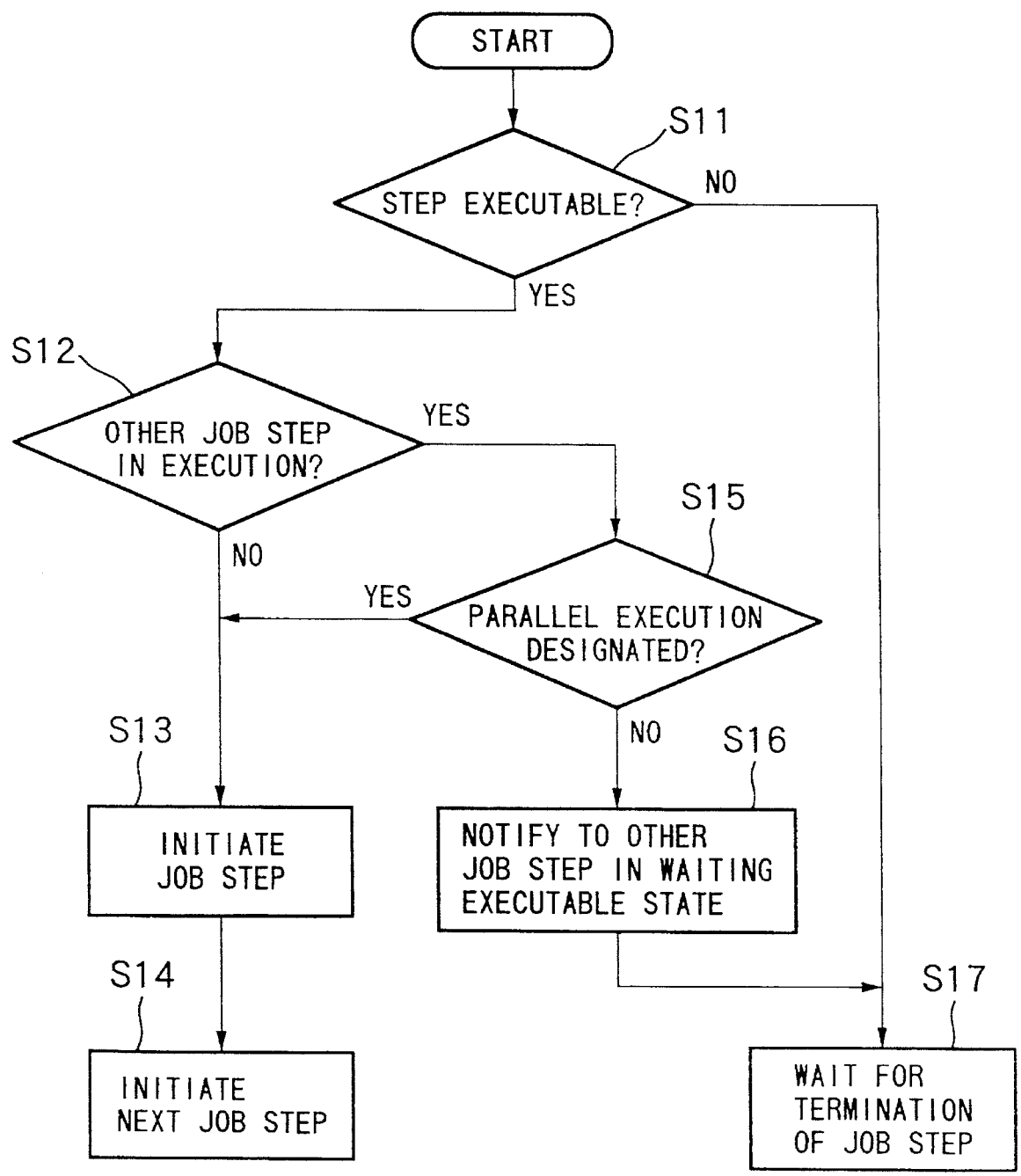
FIG. 3A is a flowchart showing a process upon initiating job step in the first embodiment the job step parallel execution system.

Referring to FIG. 3A, the process upon initiation of the job step in the shown embodiment of the job step parallel execution control system performs control process through a job step execution permission judgement step S11, an executing other job step presence and absence judgement step S12, a job step initiating process step S13, a next job step initiating process step S14, a parallel execution designation judgement step S15, a notifying process S16 for a other job waiting for executable state, and a job step termination waiting process step S19.

Figure 3B:
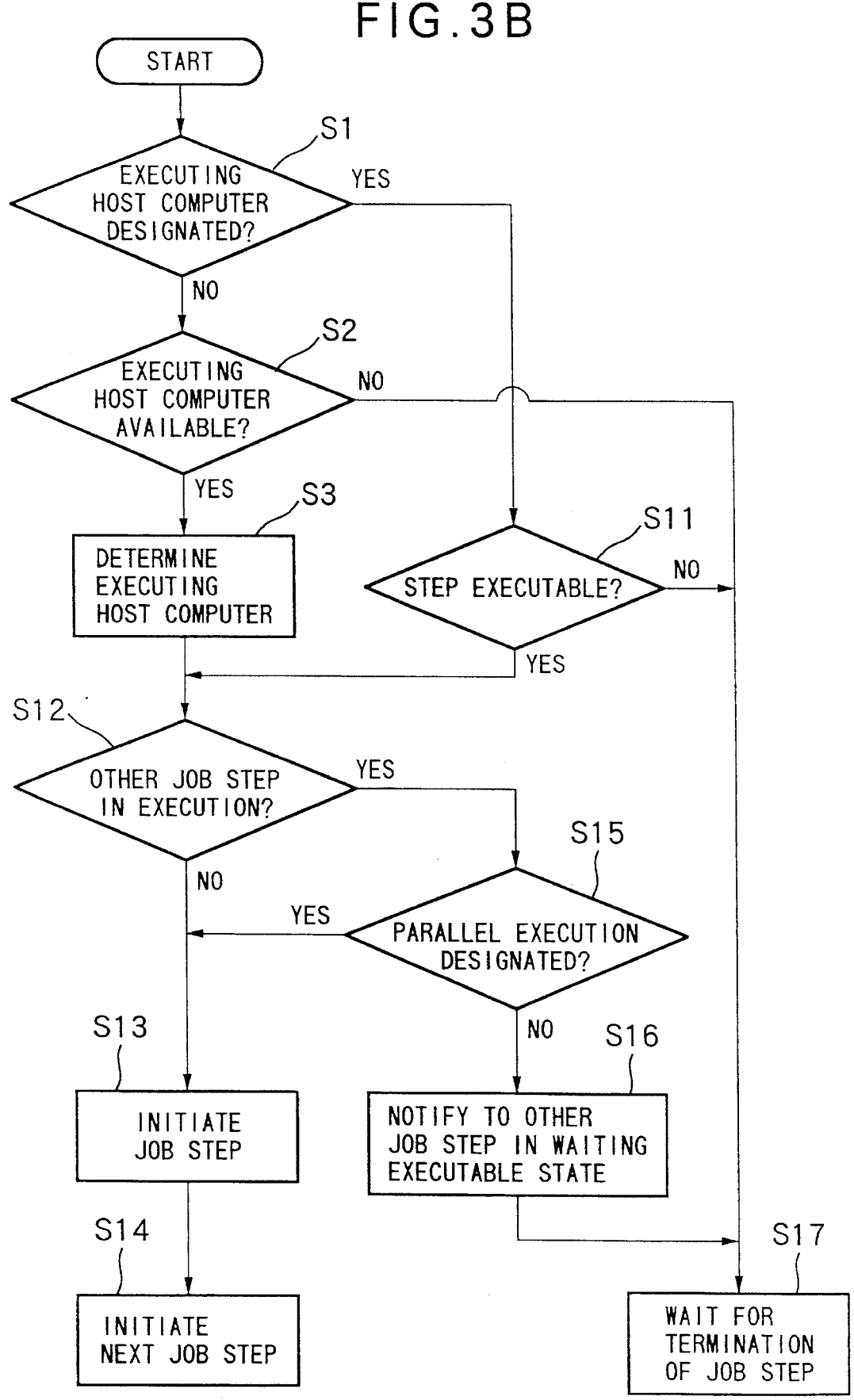
FIG. 3B is a flowchart showing a process upon initiating job step in the second embodiment the job step parallel execution system.

Referring to FIG. 3B, the process upon initiation of the job step in the shown embodiment of the job step parallel execution control system performs control process through an executing host computer designation judgement step S1, an executable host computer presence and absence judgement step S2, an executing host computer determining process step S3, a job step execution permission judgement step S11, an executing other job step presence and absence judgement step S12, a job step initiating process step S13, a next job step initiating process step S14, a parallel execution designation judgement step S15, a notifying process S16 for a other job waiting for executable state, and a job step termination waiting process step S19.

Figure 4:
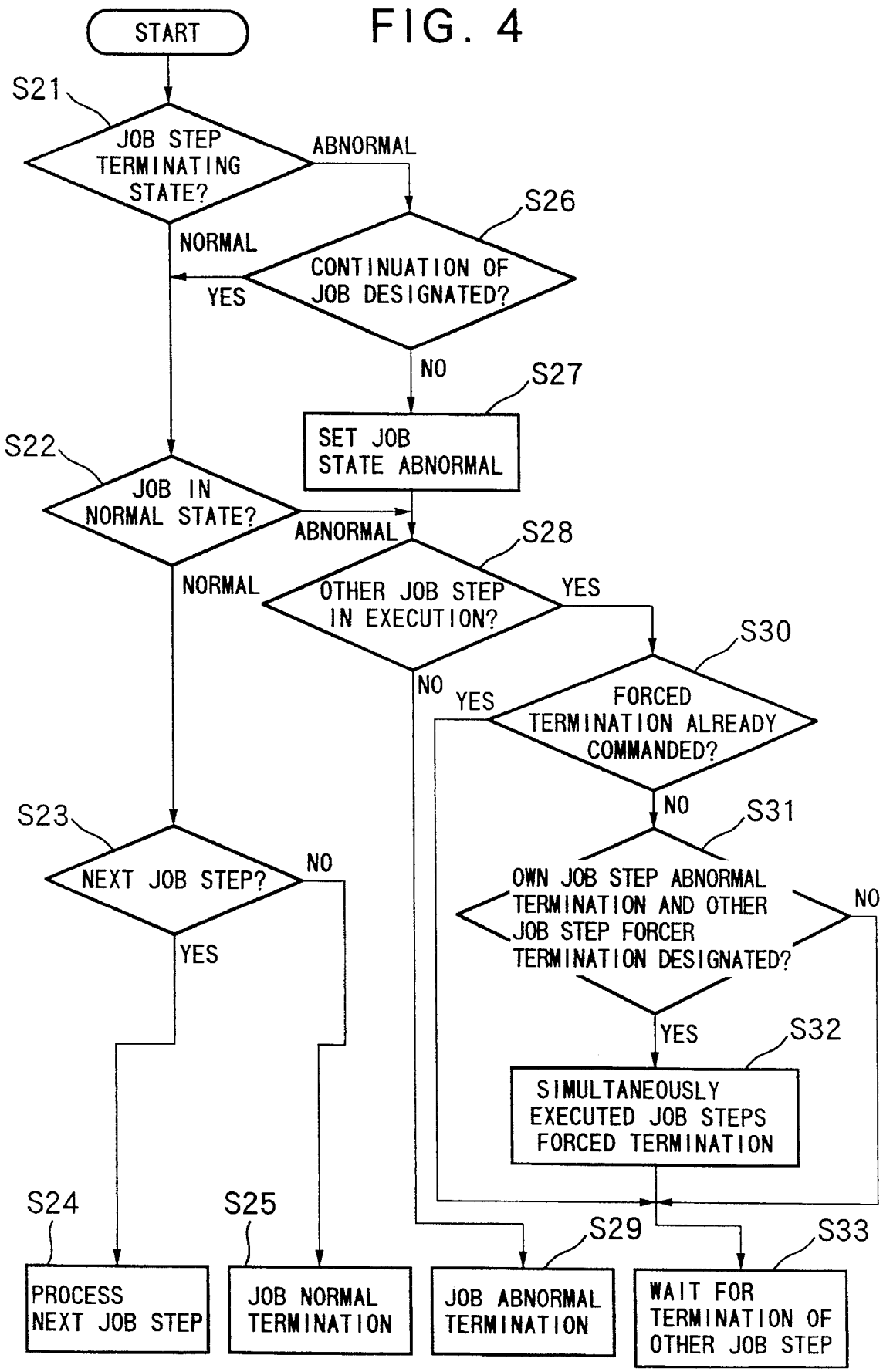
FIG. 4 is a flowchart showing a process upon termination of the job step in the shown embodiment of the job step parallel execution system.

Referring to FIG. 4, the process upon termination of the job step in the illustrated embodiment of the job step parallel execution control system performs the process through a job step terminating condition judgement step S21, a job state judgement step S22, a next job step presence and absence judgement step S23, a next job step processing step S24, a job normal termination processing step S25, a jib continuation designation presence and absence judgement step S26, a job abnormal state setting processing step S27, an executing other job step presence and absence judgement step S28, a job abnormal termination processing step S29, a instant forced termination command presence and absence judgement step S30, a own job step abnormal termination and other job step forced termination designation presence and absence judgement step S31, the simultaneously executed job step forced termination processing step S32 and an other job step termination waiting process step S33.

Next, the operation of the first embodiment of the job step parallel execution control system constructed as set forth above will be discussed. At first, the process upon initiation of the job step will be discussed with reference to the flowchart of FIG. 3.

Upon execution of the job applied to the computer system, the job control language translating portion 11 sequentially decodes the job control statement 2 of the job.

At the judgement step S11 immediately after starting execution, the load condition of the computer system, such as multiplicity of execution of job steps defined in the computer system with reference to the job execution information stored in the job execution information storage portion 12 and the job step execution information stored in the job step execution information storage portion 13, and whereby checks whether the job step can be executed or not.

When the job step cannot be executed, then, a executable state waiting information is set in the job execution information storage portion 12 to wait for termination of the currently executed job step of other job or other job step of the own job.

When judgement is made that the job step can be executed at the judgement step S11, the job step execution commanding portion 14 checks whether other job step of the own job is currently in execution or not with reference to the job execution information stored in the job execution information storage portion 12 and the job step execution information stored in the job step execution information storage portion 13 (judgement step S12).

When judgement is made at the judgement step S5 that no other step of the own job is currently in execution, the job step execution portion 14 commands initiation of the program designated in the job step execution command to the job step initiating portion 16. Also, the job step execution portion 14 adds the information indicative of initiation of the new job step in the job execution information storage portion 12 and the job step execution information storage portion 13. The job step initiating portion 16 triggers the job step executing portion 3 to execute the program designated by the job step execution command (process step S13).

On the other hand, when if other step in the own job is in execution as checked at the judgement step S12, the job step execution commanding portion 14 checks whether the job step parallel execution designation is present in the job step execution command (judgement step S15).

When the parallel execution is not designated as checked at the judgement step S15, the job step execution commanding portion 14 retrieves other job in waiting state for termination of the currently executed job step with reference to the job execution information in the job execution information storage portion 12 to notice that the job step can be executed (process step S16). Subsequently, the job step execution commanding portion 14 sets the information indicative of the waiting state of the executable state in the job execution information in the job execution information storage portion 12 to wait for termination of the currently executed job step of other job or other job step of the own job (process step S17).

When the parallel execution is designated as checked at the judgement step S15, the job step execution commanding portion 14 commands to the job step initiating portion 15 to initiate execution of the program designated by the execution command for the job step. At the same time, the job step execution commanding portion 14 adds the information indicative of initiation of new job step in the job execution information storage portion 12 and the job step execution information storage portion 13. The job step initiating portion 15 then makes the job step executing portion 3 to initiate the program designated by the job step execution command.

After initiation of operation of the job step executing portion 3, the job step execution commanding portion 14 makes the job control language translating portion 11 to decode the subsequent job control language 2 for initiating execution of the next job step (process step S14).

Next, discussion will be given for the job step termination process with reference to the flowchart in FIG. 4. When one of the job step executing portion terminates execution in the host computer H1, the job step termination receiving portion 16 receives the information indicative of termination of execution by the job step executing portion 3 and the terminating condition and transfers the received information to the job step termination processing portion 17. The job step termination processing portion 17 checks the terminating condition of the job step notified by the job step termination receiving portion 16 (judgement step S21). If the job step is abnormally terminated, the job step termination processing portion 17 checks whether the operation designation upon abnormal termination of the job step, designated by the job step execution command, is continuation of the job or not (judgement step S26).

When the normal termination of the job step is judged at the judgement step S21 and when the operation designation upon abnormal termination of the job step us continuation of the job even if the abnormal termination of the job step is judged at the judgement step S26, the job step termination processing portion 17 checks the state of the job with reference to the job execution information stored in the job execution information storage portion 12.

If the job step is normally terminated, the job step termination processing portion 17 continues decoding of the job control statement 2 from the job control language translating portion 11 to check whether the next job step is present or not (judgement step S23). If the next job step is present, the job step termination processing portion 17 initiate the job (process step S24). On the other hand, if the next job is not present, the job step termination processing portion 17 terminates the job normally (process step S25).

When the operation designation upon abnormal termination of the job step is other than continuation, the job step termination processing portion 17 sets the abnormal state of the job in the job execution information storage portion 12 (process step S27).

If the job state is set as abnormal at the process step S27 and when the abnormal state of the job is already noted by the judgement step S22, the job step termination processing portion 17 checks whether the currently executed other job step of the own job is present with reference to the job execution information storage portion 12 and the job step execution information storage portion 13 (judgement step S28). When there is no currently executed other job step of the own job, the job step terminating portion 17 abnormally terminates the job step (process step S29).

When the currently executed other job step is present as checked at the judgement step S28, the job step termination processing portion 17 checks whether the forced termination is already commanded to the currently executed other job step with reference to the job execution information stored in the job execution information storage portion 12 and the job step execution information stored in the job step execution information storage portion 13 (judgement step 30). When the forced termination is already commanded, the job step termination processing portion 17 waits for termination of the currently executed other job step.

On the other hand, when the forced termination is not yet commanded as checked at the judgement step S30, the job step termination processing portion 17 checks whether the execution by the job step executing portion is abnormally terminated and the operation designation upon abnormal termination of the job step is forced termination or not (judgement step 31).

As a result of check at the judgement step S31, if the job step is abnormally terminated and the operation designation upon abnormal termination of the job step designated by the job step execution command is forced termination, the job step termination processing portion 17 makes the executing job step forcedly terminating portion 19 to terminate the currently executed other job step by the simultaneously executed job step forced termination commanding portion 18 with reference to the job execution information storage portion 12 and the job step execution information storage portion 13 (process step S32). In conjunction therewith, at the process step S32, the job step termination processing portion 17 sets the forced termination commanding state in the job execution information storage portion 12. Then, the job step termination processing step waits for termination of other job step (process step S33).

On the other hand, as a result of check at the judgement step S31, the job step is normally terminated or the operation designation upon abnormal termination of the job step designated by the job step execution command is other than forced termination, the job step termination processing portion 17 waits for termination of the currently executed other job step (process step S33).

On the other hand, upon forced termination of the job, if the relevant job has other step currently executed, the job step processing portion 17 commands forced termination of the currently executed other job step to the executing job step forcedly terminating portion 19 via the simultaneously executed job step forced termination commanding portion 18.

The executing job step forcedly terminating portion 19 is responsive to the forced termination command from the simultaneously executed job step forced termination commanding portion 18 to forcedly terminate the currently executed other step.

Figure 2A:
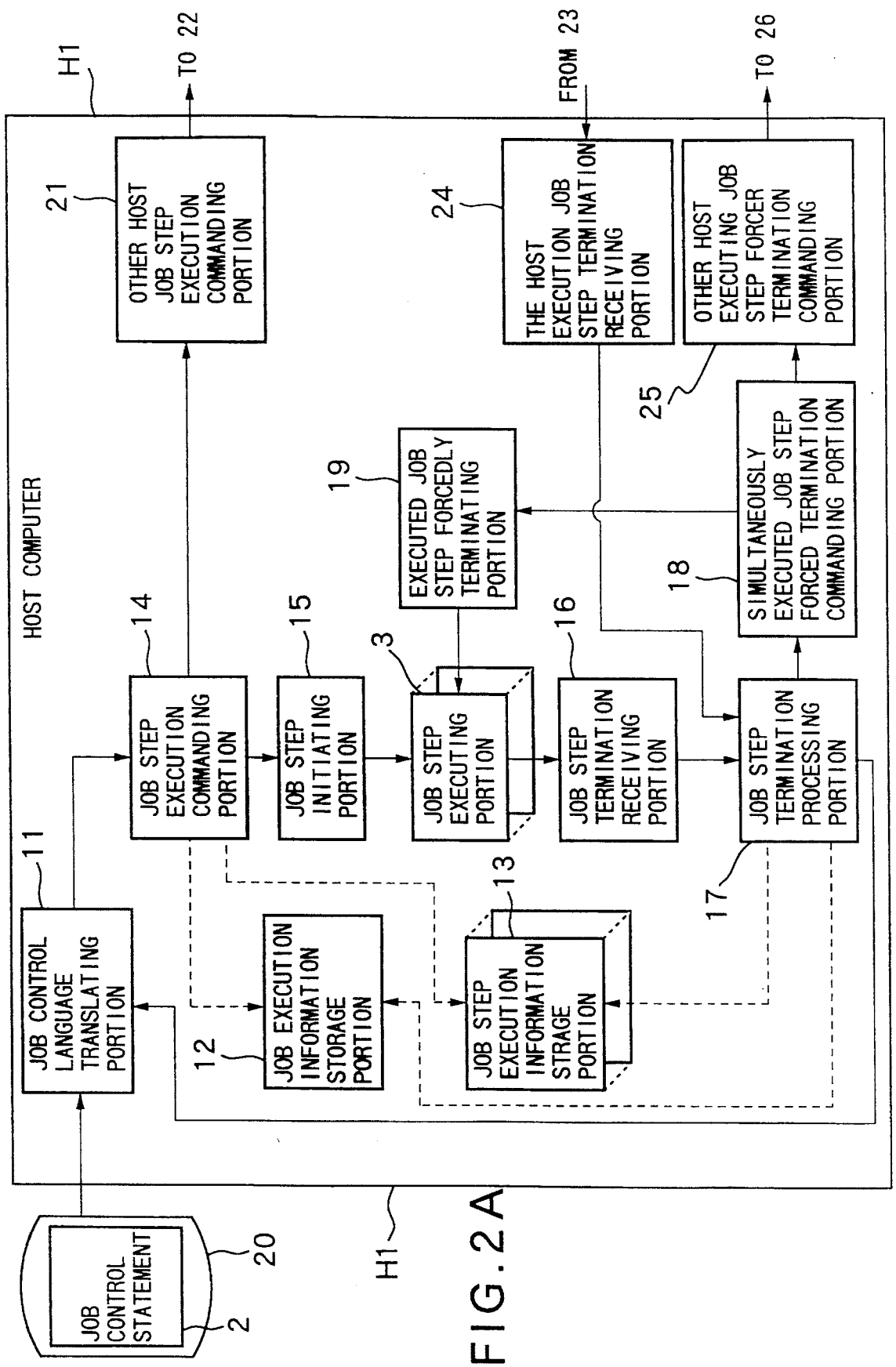
FIGS. 2A and 2B are block diagrams of showing a computer system comprising a plurality of host computers, to which one embodiment of a job step control system according to the present invention is applied.
Figure 2B:
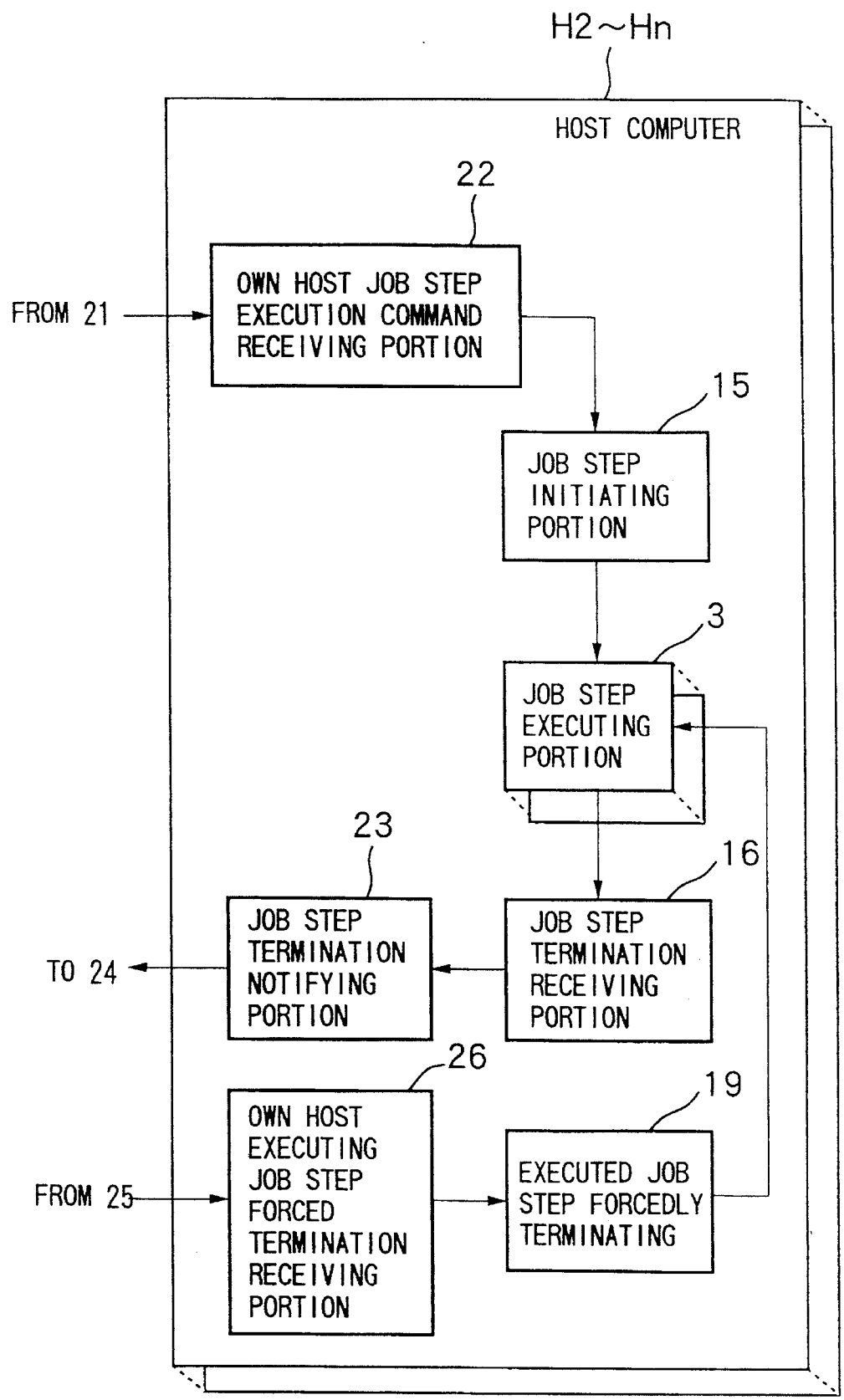

FIGS. 2A and B are block diagrams of a computer system, to which the second embodiment of a job step parallel execution control system according to the present invention is applied. The illustrated computer system comprises a plurality of host computers H1~Hn (n is positive integer) and the storage device 20 connected to the host computer H1 and storing the job control statement 2 written by the job control language (JCL) for controlling execution of the job applied to the computer system.

Among the job control statement 2 of the job applied to the computer system, the job step execution command is permitted to include the parallel execution designation (see FIG. 5) and the operation designation upon abnormal termination, as set forth above. In addition, as shown in FIG. 7, the job step execution command may further include designation whether the job step is to be executed by a specific computer or by an arbitrary computer. In FIG. 7, when the job step is to be executed by designating the host computer H1, the designation is made as "SYSTEM=HOST 1". On the other hand, when the computer to execute the job step is not specified, designation is made as "SYSTEM= GLOBAL".

The host computer H1 is constructed by adding an other host job step execution commanding portion 21, an other host executing step termination receiving portion 24 and an other host executing job step forced termination commanding portion 25 to the computer illustrated in FIG. 1. Accordingly, the detailed description for the components appearing on FIG. 1 will be omitted for simplification of disclosure.

The job execution information storage portion 12 of the host computer H1 stores the job execution information initiated in all of the host computers H1~Hn. Also, the job step execution information storage portion 13 in the host computer H1 stores the job step execution information initiated by all of the host computers H1~Hn.

The host computers H2~Hn are connected to the host computer H1 through a loose coupling via an auxiliary storage device, on-line connection via communication lines or so forth. Each of the host computers H2~Hn comprises one or more job step executing portion 3, the job step initiating portion 15, the job step termination receiving portion 16, the executing job step forcedly terminating portion, an own host job step execution command receiving portion 22, the job step termination notifying portion 23 and an own host executing job step forced termination receiving portion 26. It should be noted that the portions in the host computers H2~Hn common to those in the host computer H1 will be represented by the same reference numerals.

The other host job step execution commanding portion 21 commands execution of the job step when the executing host computer designated by the job step execution command detected by the job control language translating portion 11 is not specified and arbitrarily selected host computer by the job step execution commanding portion is not own host computer H1 but other computer H2~Hn, and when the host computer identified by the job step execution command detected by the job control language translating portion 11 is the specified one of the computers H2~Hn other than the own host computer H1.

The own host job step execution command receiving portion 22 receives the job step execution command to own computer H2~Hn from the other host job step execution commanding portion 21 of the host computer H1.

The job step termination notifying portion 22 notifies the information indicative of termination of execution of the job step by the job executing portion 3 and the terminating condition received by the job step termination receiving portion 16 of the own host computer H2~Hn, to the host computer H1 as which commanded execution of the job step.

The other host executing job step termination receiving portion 24 receives the information indicative of termination of execution by the job step executing portion 3 and the terminating condition notified by the job step termination notifying portion 23 of the other host computer H2~Hn.

The other host executing job step forced termination commanding portion 25 commands forced termination of the currently executed other job step to the relevant host computer H2~Hn when the job step which is commanded to be forcedly terminated by the simultaneously executed job step forced termination commanding portion 18 is currently executed by the job step executing portion 3 in the host computer H2~Hn other than the own host computer H1.

The own host executing job step forced termination receiving portion 26 receives the forced termination command for the currently executed other job step in the own host computer H2~Hn, from the other host executing job step forced termination commanding portion 25 of the host computer H1.

Next, the operation of the second embodiment of the job step parallel execution control system constructed as set forth above will be discussed.

At first, the process upon initiation of the job step will be discussed with reference to FIG. 3B.

In the host computer H1, in which the execution of the job step is initiated, upon execution of the job applied to the computer system, the job control language translating portion 11 sequentially decodes the job control statement 2 of the job.

When the job step execution command is detected by the job control language translating portion 11, check is performed whether the job step execution command contains designation for execution of the job step by a specific host computer (judgement step S1).

If the specific host computer (hereinafter assumed as the host computer H2 other than the host computer H1 for the disclosure purpose) is designated for executing the job step as checked at the judgement step S1, the job step execution commanding portion 14 checks the load condition of the computer system, such as multiplicity of execution of the job steps defined in the specific host computer H2 with reference to the job execution information stored in the job execution information storage portion 12 and the job step execution information stored in the job step execution information storage portion 13 (judgement step S11).

If the specific host computer H2 cannot be in service to the commanded job step, the job step execution commanding portion 14 sets the waiting state for the executable condition in the job execution information storage portion 12 and waits for termination of the job step of the other job or the other step of the own job currently executed in the specific host computer H2 (process step S17).

On the other hand, when the execution designation to execute the job step with the arbitrary host computer H1~Hn in the job step execution command as checked at the judgement step S2, the job step execution commanding portion 14 checks load condition of the computer system, such as multiplicity of execution of the job steps defined with respect to respective host computers H1~Hn with reference to the job execution information stored in the job execution information storage portion 12 and the job step execution information stored in the job step information storage portion 13 (judgement step S2)

If judgement is made at the judgement step S2 that there is no host computer which can execute the job step, the job step execution commanding portion 14 sets the information indicative of waiting state for the executable condition in the job execution information storage portion 12 and waits for termination of the job step of the other job or the other step of the own job currently executed (process step S17).

On the other hand, if judgement is made that there is a host computer which can execute the job step as checked at the judgement step S2, the job step execution commanding portion 14 determines the host computer (hereinafter assumed as the host computer H2 other than the host computer H1), on the basis of the load condition of the computer system, such as multiplicity of execution of the job steps defined with respect to respective host computers H1~Hn (process step S3).

When judgement is made that the job step can be executed by the specific computer H2 at the judgement step S11 or when the host computer (i.e. the host computer H2 in the shown case) is determined at the process step S3, the job step execution commanding portion 14 checks whether other job step of the own job is currently in execution in the specific host computer H2 or not with reference to the job execution information stored in the job execution information storage portion 12 and the job step execution information stored in the job step execution information storage portion 13 (judgement step S12).

When judgement is made at the judgement step S12 that no other step of the own job is currently in execution in the specific computer H2, the job step execution portion 14 of the host computer H1 commands initiation of the program designated in the job step execution command to the job step initiating portion 16 of the specific host computer H2 through the other job step execution commanding portion 21. Also, the job step execution portion 14 adds the information indicative of initiation of the new job step in the job execution information storage portion 12 and the job step execution information storage portion 13. The job step initiating portion 16 of the specific host computer H2 triggers the job step executing portion 3 to execute the program designated by the job step execution command (process step S13).

On the other hand, when if other step in the own job is in execution in the specific host computer H2 as checked at the judgement step S12, the job step execution commanding portion 14 of the host computer H1 checks whether the job step parallel execution designation is present in the job step execution command (judgement step S15).

When the parallel execution is not designated as checked at the judgement step S15, the job step execution commanding portion 14 in the host computer H1 retrieves other job in waiting state for termination of the currently executed job step with reference to the job execution information in the job execution information storage portion 12 to notice that the job step can be executed (process step S16). Subsequently, the job step execution commanding portion 14 of the host computer H1 sets the information indicative of the waiting state of the executable state in the job execution information in the job execution information storage portion 12 to wait for termination of the currently executed job step of other job or other job step of the own job (process step S17).

When the parallel execution is designated as checked at the judgement step S15, the job step execution commanding portion 14 of the host computer H1 commands to the job step initiating portion 15 of the specific host computer H2 to initiate execution of the program designated by the execution command for the job step through the other host job step execution commanding portion 21. At the same time, the job step execution commanding portion 14 adds the information indicative of initiation of new job step in the job execution information storage portion 12 and the job step execution information storage portion 13.

In the host computer H2, the own host job step execution command receiving portion 22 receives the job step execution command issued by the other host job step execution commanding portion 21 of the other host computer H1.

The job step initiating portion 15 of the host computer H2 then makes the job step executing portion 3 to initiate the program designated by the job step execution command received by the own host job step execution command receiving portion 22 at the step S13.

After initiation of operation of the job step executing portion 3, the job step execution commanding portion 14 of the host computer H1 makes the job control language translating portion 11 to decode the subsequent job control language 2 for initiating execution of the next job step (process step S14).

It should be noted that by adding a judgement step for making judgement whether the computer system is constituted of a single or a plural host computers before the judgement step S1 of FIG. 3B, so that process may branch to the judgement step S1 when the computer system comprises a plurality of host computers and otherwise to the judgement step S11, a common job control statement for the first and second embodiments may be established.

Next, discussion will be given for the job step execution termination process with reference to FIG. 4. When the execution of the job step by the job step executing portion 3 is terminated in the host computer H1, the operations of the job step termination receiving portion 16 and the job step termination processing portion 17 are the same as that discussed with respect to the first embodiment. Therefore, detailed description is omitted for simplification of the disclosure.

On the other hand, when the execution of the job step by the job step executing portion 3 in the host computer other than the host computer H1 (hereinafter assumed as the host computer H2 in the purpose of illustration), the job step termination receiving portion 16 of the host computer H2 receives the information indicative of termination of the job step executed by the job step executing portion 3 and the terminating condition and transfers the information to the job step termination notifying portion 23.

The job step termination notifying portion 23 of the host computer H2 notifies the fact that the execution of the job step executed by the job step executing portion 3 is terminated and the terminating condition to the host computer H1 which commanded execution of the executed job step.

In the host computer H1, the other host executed job step termination receiving portion 24 receives the notice of termination of execution by the job step executing portion 3 from the host computer H2 and transfers the information to the job step termination processing portion 17.

The job step termination processing portion 17 performs the termination process of execution of the job step executing portion of the host computer H2 in substantially the same manner to that upon termination of execution of the job step executing portion 3 in the host computer H1.

When the job is forcedly terminated by the job step termination processing portion 17, the simultaneously executed job steps forced termination commanding portion 18 issues forced termination command for the currently executed other step in the host computer H1 and issues the forced termination command for currently executed other steps in the other computers H2 to Hn to the other host executed job step forced termination commanding portion 25.

The executed job step forcedly terminating portion 19 of the host computer H1 forcedly terminates the currently executed other steps by the own host computer H1 on the basis of the forced termination command for the job step executing portion issued by the simultaneously executed job step forced termination processing block.

The other host execution job step forced termination command 25 commands forced termination of the execution of the job step executing portion 3 to the other host computers H2 to Hn.

In the host computers H2 to H1, the own host executed job step forced termination receiving portion 26 receives the information indicative of the forced termination command issued by the other host executed job step termination commanding portion S25. Then, the currently executed job steps executed by own host computer H2 to Hn are forcedly terminated by the executed job step forcedly terminating portion 19.

Figure 8A:
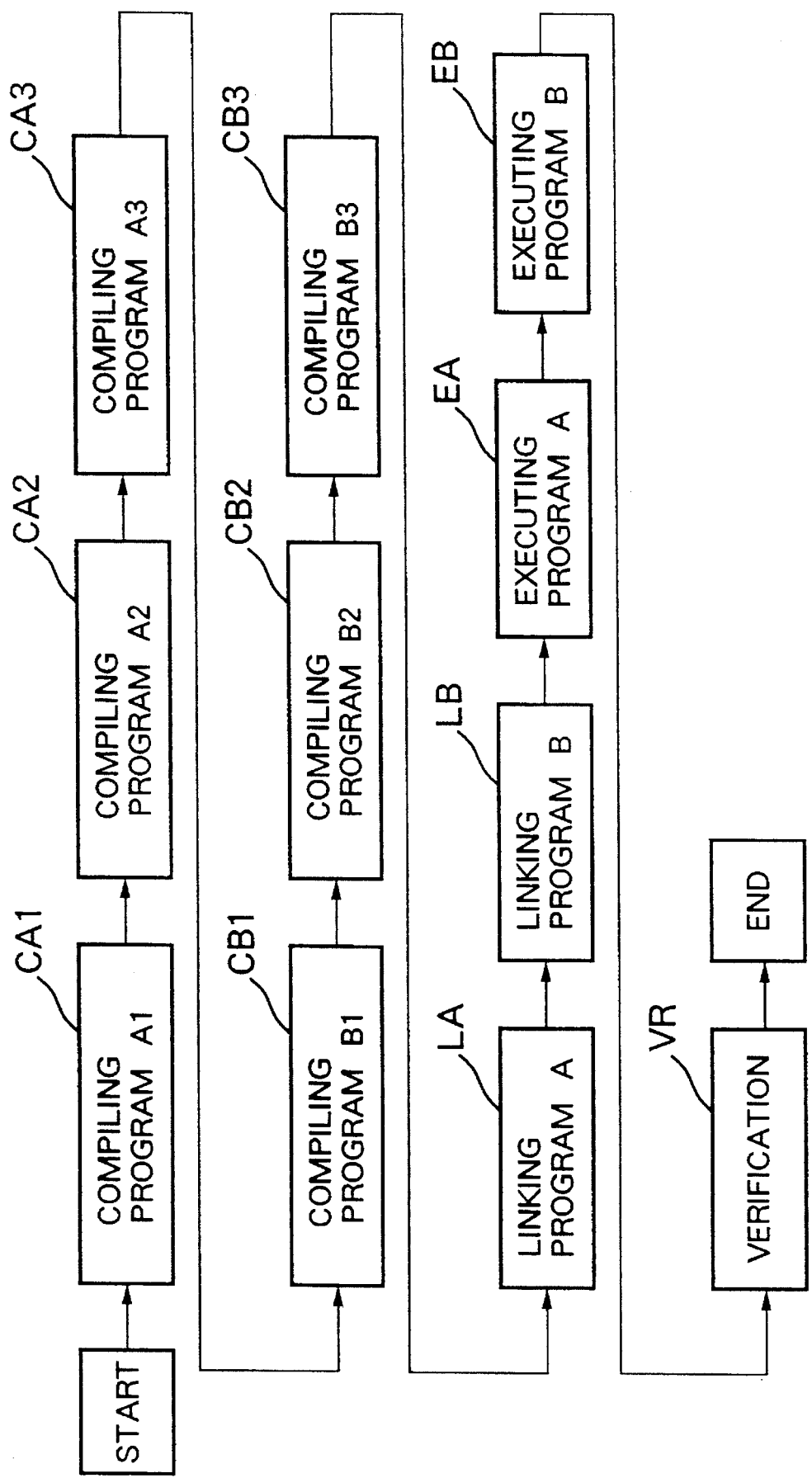
FIG. 8A is an illustration showing an example of operation of the job step using system, to which the present invention is not applied.

In the jobs illustrated in FIGS. 8(A) and 8(B) are assumed after execution of a compiling of a program A1 (CA1), a compiling of a program A2 (CA2), a compiling of a program A3 (CA3), a compiling of a program B1 (CB1), a compiling of a program B2 (CB2) and a compiling of a program B3 (CB3), an execution program A is generated by linking (LA) compiling units of the programs A1, A2 and A3, an execution program B is generated by linking the compiling units of the programs B1, B2 and B3, the generated execution program A is executed (EA), the generated execution program B is executed (EB), and a result of execution of the execution program A and a result of execution of the execution program B are verified (VR).

In the foregoing job, the compiling of the program A1 (CA1), the compiling of the program A2 (CA2), the compiling of the program A3 (CA3), the compiling of the program B1 (CB1), the compiling of the program B2 (CB2) and the compiling of the program B3 (CB3) have no mutual association in process and can be executed in parallel.

The linking (LA) of the execution program A is necessary to be executed after the compiling of the program A1 (CA1), the compiling of the program A2 (CA2), the compiling of the program A3 (CA3). Similarly, the linking (LB) of the execution program B is necessary to be executed after the compiling of the program B1 (CB1), the compiling of the program B2 (CB2) and the compiling of the program B3 (CB3).

The linking (LA) of the execution program A and the linking (LB) of the execution program B have no association and thus can be executed in parallel.

The execution (EA) of the execution program A is necessary to be performed after completion of the linking (LA) of the execution program A. Also, the execution (EB) of the execution program B is necessary to be done after completion of the linking (LB) of the execution program B.

Execution (EA) of the execution program A and execution (EB) of the execution program B are not associated with each other and thus can be performed in parallel. Verification (VR) of the results of execution must be performed after execution (EA) of the execution program A and execution (EB) of the execution program B.

FIG. 8A shows an example of operation of the job steps of the job by the job control statement in a situation where the present invention is not applied. All steps are described to be executed sequentially so that the not mutually associated the compiling of the program A1 (CA1), the compiling of the program A2 (CA2), the compiling of the program A3 (CA3) are not executed simultaneously. Similarly, the not mutually associated the compiling of the program B1 (CB1), the compiling of the program B2 (CB2) and the compiling of the program B3 (CB3) are not executed simultaneously. Furthermore, the linking (LA) of the execution program A and the linking (LB) of the execution program B, which are not mutually associated in the process, are not executed simultaneously. In addition, the execution (EA) of the execution program A and the execution (EB) of the execution program B, which are not mutually associated in the process, are not executed simultaneously.

As shown in FIG. 8B, in an example of operation of the job steps, to which the shown embodiment of job step parallel execution control system is applied, by permitting designation of capability of parallel execution to the prior initiated job step in the job step execution command, the compiling of the program A1 (CA1), the compiling of the program A2 (CA2), the compiling of the program A3 (CA3), the compiling of the program B1 (CB1), the compiling of the program B2 (CB2) and the compiling of the program B3 (CB3), the linking (LA) of the execution program A and the linking (LB) of the execution program B, the execution (EA) of the execution program A and the execution (EB) of the execution program B are designated to be executed in parallel. By this, the compiling of the program A1 (CA1), the compiling of the program A2 (CA2), the compiling of the program A3 (CA3), the compiling of the program B1 (CB1), the compiling of the program B2 (CB2) and the compiling of the program B3 (CB3) are executed in parallel.

On the other hand, after completion of execution of the compiling processes, the linking (LA) of the execution program A and the linking (LB) of the execution program B are executed in parallel, simultaneously. Also, after completion of the linking (LA) of the execution program A and the linking (LB) of the execution program B, the execution (EA) of the execution program A and the execution (EB) of the execution program B are performed in parallel. After completion of execution (EA) of the execution program A and the execution (EB) of the execution program B, verification (VR) of the results of execution can be performed.

As set forth above, by operating a plurality of job steps simultaneously, it becomes possible to establish a multitask programming for one job to allow use of the resource of the computer system more effectively and to improve throughput of the job.

Also, in the computer system formed with a plurality of host computers, by designating that the job step can be executed by the arbitrarily selected host computer, the job steps which can be executed simultaneously, such as the compiling of the program A1 (CA1), the compiling of the program A2 (CA2), the compiling of the program A3 (CA3), the compiling of the program B1 (CB1), the compiling of the program B2 (CB2) and the compiling of the program B3 (CB3) can be executed with distributed manner to the host computers having relatively low load.

Also, by permitting designation of execution of the job step by the specific computer, it becomes possible, for example, that the execution (EA) of the execution program A and the execution (EB) of the execution program B are performed by a single or a plural specific host computers having high speed arithmetic feature, and other job steps which do not require the high speed arithmetic feature are executed by the host computers which do not have the high speed arithmetic feature. This permits effective and efficient use of the resource of the host computers.

Furthermore, when one of the simultaneously executed steps is terminated abnormally, and when execution of other job step has no meaning, for instance if respective outputs of the job steps of the foregoing job use a temporary file which is available only during execution of the job, and one of the compiling of the program A1 (CA1), the compiling of the program A2 (CA2), the compiling of the program A3 (CA3) causes compile error to results in abnormal termination, the simultaneously executed other job steps and subsequently executed other steps should have no meaning at all. Therefore, in the illustrated embodiment of the job step parallel execution control system, designation to forcedly terminate the other job steps to terminate the job as an operation upon abnormal termination of the job step, can be contained in the job step execution command.

On the other hand, when subsequent job steps have no meaning upon occurrence of abnormal termination of one of the simultaneously executed job steps, for instance, if respective outputs of the job steps of the foregoing job use a permanent file which is available only during execution of the job, and one of the compiling of the program A1 (CA1), the compiling of the program A2 (CA2), the compiling of the program A3 (CA3) causes compile error to results in abnormal termination, the process of the job steps simultaneously executed is effective, and subsequent steps will have no meaning at all. Therefore, in the illustrated embodiment of the job step parallel execution control system, designation to terminate the job after termination of the currently executed other job steps as the operation upon occurrence of abnormal termination of the job step, is permitted to contained in the job step execution command.

Furthermore, when execution of the job steps in the job have no relation to each other, designation to continue the job operation as the operation upon occurrence of abnormal termination of the job step, is permitted to be contained in the job step execution command.

As set forth above, according to the illustrated embodiments of the job step parallel execution control system according to the present invention, the system permits simultaneous execution of a plurality of steps of a single job by permitting designation in an execution command of a job control statement whether parallel execution of own step while other step in the same job is in execution is possible or not and whereby allow to use the resource of the computer system efficiently.

Also, the job step parallel execution control system permits to continue execution of a job, to forcedly terminate execution of the job or to terminate the job upon completion of other steps of the job in execution when a certain step is terminated abnormally during simultaneous execution of a plurality of steps of the single job, by permitting designation for operation to continue execution of job, in the execution command of the steps in the job control statement, to forcedly terminate execution of the job or to terminate the job upon completion of other steps of the job in execution when the own step is terminated abnormally, and whereby allow to use the resource of the computer system efficiently.

The job step parallel execution control system further permits simultaneous execution of a plurality of steps of a single job by permitting designation in an execution command of a job control statement whether parallel execution of own step while other step in the same job is in execution is possible or not, and permits to continue execution of a job, to forcedly terminate execution of the job or to terminate the job upon completion of other steps of the job in execution when a certain step is terminated abnormally during simultaneous execution of a plurality of steps of the single job, by permitting designation for operation to continue execution of job, in the execution command of the steps in the job control statement, to forcedly terminate execution of the job or to terminate the job upon completion of other steps of the job in execution when the own step is terminated abnormally, and whereby allow to use the resource of the computer system efficiently.

The job step parallel execution control system further permits simultaneous execution of a plurality steps in the single job and execution of a plurality of simultaneously executed steps with specific or arbitrary computers in a computer system comprising a plurality of computers, by permitting designation whether parallel execution of the own step while other step in the same job is in execution is possible or not and designation whether the own step is to be executed and by the specific computer or arbitrary selected computer, in the execution command for the step in the job control statement, and whereby allow to use the resource of the computer system efficiently.

The job step parallel execution control system still further permits execution of a plurality of simultaneously executed steps with specific or arbitrary computers in a computer system comprising a plurality of computers by permitting designation whether the own step is to be executed by the specific computer or arbitrary selected computer, in the execution command for the step in the job control statement, and which further permits to continue execution of a job, to forcedly terminate execution of the job or to terminate the job upon completion of other steps of the job in execution when a certain step is terminated abnormally during simultaneous execution of a plurality of steps of the single job, by permitting designation for operation to continue execution of job, in the execution command of the steps in the job control statement, to forcedly terminate execution of the job or to terminate the job upon completion of other steps of the job in execution when the own step is terminated abnormally, and whereby allow to use the resource of the computer system efficiently.

The job step parallel execution control system which permits simultaneous execution of a plurality of steps of a single job by permitting designation in an execution command of a job control statement whether parallel execution of own step while other step in the same job is in execution is possible or not, which also permits to continue execution of a job, to forcedly terminate execution of the job or to terminate the job upon completion of other steps of the job in execution when a certain step is terminated abnormally during simultaneous execution of a plurality of steps of the single job, by permitting designation for operation to continue execution of job, in the execution command of the steps in the job control statement, to forcedly terminate execution of the job or to terminate the job upon completion of other steps of the job in execution when the own step is terminated abnormally, and which further permits execution of a plurality of simultaneously executed steps with specific or arbitrary computers in a computer system comprising a plurality of computers by the specific computer or arbitrary selected computer, in the execution command for the step in the job control statement, and whereby allow to use the resource of the computer system efficiently.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A job step parallel execution control system for a job control language of a computer system comprising:

information storage means for storing information regarding a condition of a job and a plurality of job steps in execution;

job controlling means for describing a content of an execution control command of one of the job steps and an execution order of the job steps by a job control language, the job control language including a job control statement having a job step execution command designating whether a parallel execution during execution of a job step other than the one of the job steps in a same job is permitted upon commanding execution of the one of the job steps;

job control statement translating means for sequentially decoding said job control statement of a job to be executed;

job step execution commanding means for commanding execution of said one of the job steps upon detecting the job step execution command contained in said job control statement through decoding by said job control statement translating means when no job step in execution in the same job is detected from said information stored in said information storage means or when the job step execution command contains a designation for parallel execution; and job step executing means responsive to said job step execution command for initiating and executing a program designated by said job step execution command as an executed job step.

2. A job step parallel execution control system for a job control language of a computer system as set forth in claim 1, wherein said job step execution commanding means comprises:

means for judging whether the other of the job steps in said job is an execution by making reference to said information storage means storing the information of said job and said job steps when the execution command of said one of the job steps of said job is detected through decoding of said job control statement;

means for judging whether said job step execution command contains the designation for parallel execution of the job steps; and means for adding information of a newly executed job step to said information storage means.

3. A job step parallel execution control system for a job control language of a computer system as set forth in claim 1, which further comprises:

means for containing an indication in the job step execution command in said job control statement indicating whether (1) said job is to be continued, (2) said job is to be forcedly terminated or (3) said job is to be terminated after termination of execution of the other of the job steps in said job upon abnormal termination of the one of the job steps;

job step termination receiving means for receiving information indicative of a termination state of the one of the job steps upon termination of the one of the job steps which is executed;

termination processing means for making judgement for termination of the job step received by said job step termination receiving means and terminating said job according to the content of the job step execution command in said job control statement when the job step termination state is not a normal termination;

forced termination commanding means for commanding forced termination of the other of the job steps in execution when the job step execution command designates forced termination of the job; and forced termination means for forcedly terminating the other of the job steps in execution when the job step execution command designates forced termination for the other of the job steps.

4. A job step parallel execution control system for a job control language of a computer system comprising:

information storage means for storing information regarding a condition of a job and a plurality of job steps in execution;

job controlling means for describing a content of an execution control command of one of the job steps and an execution order of the job steps by a job control language, the job control language including a job control statement having a job step execution command designating whether (1) said job is to be continued, (2) said job is to be forcedly terminated or (3) said job is to be terminated after termination of execution of a job step other than the one of the job steps in said job upon abnormal termination of the one of the job steps;

job control statement translating means for sequentially decoding said job control statement of a job to be executed;

job step termination receiving means for receiving information indicative of a termination state of the one of the job steps upon termination of the one of the job steps which is executed;

termination processing means for making judgement for termination of the job step received by said job step termination receiving means and terminating said job according to the content of the job step execution command in said job control statement when the job step termination state is abnormal termination;

forced termination commanding means for commanding forced termination of the other of the job steps in execution when the job step execution command designates forced termination of the job; and forced termination means for forcedly terminating the other job step in execution when the job step execution command designates forced termination for the other of the job steps.

5. A job step parallel execution control system for a job control language of a computer system including a plurality of host computers, comprising:

information storage means for storing information regarding a condition of a job and a plurality of job steps in execution;

job controlling means for describing a content of an execution control command of one of the job steps and execution order of the job steps by a job control language, the job control language including a job control statement having a job step execution command designating whether (1) the job step is to be executed by a specific host computer or by an arbitrarily selected host computer, and (2) whether a parallel execution during execution of a job step other than the one of the job steps in the same job is permitted or not upon commanding execution of the one of the job steps;

job control statement translating means for sequentially decoding said job control statement of a job to be executed;

job step execution commanding means for commanding execution of said one of the job steps on the arbitrarily selected host computer designated by the execution command or on the host computer designated by said execution command upon detecting a job step execution command contained in said job control statement through decoding by said job control statement translating means when no job step in execution in the same job is detected from said information stored in said information storage means or when the job step execution command contains the designation for parallel execution; and job step executing means responsive to said job step execution command for initiating and executing a program designated by said job step execution command as an executed job step.

6. A job step parallel execution control system as set forth in claim 5, wherein said job step executing means comprises:

means for judging whether the host computer available for execution of said job step with reference to the information of the condition of the job and one of the job steps stored in said information storage means and determining one of the host computers as the specific host computer for executing the one of the job steps when said job step execution command designates execution by the arbitrarily selected host computer;

means for judging whether the specific host computer is available for execution of the one of the job steps with reference to the information of the condition of the job and the one of the job steps stored in said information storage means when said job step execution command designates execution by the specific host computer;

means for waiting for termination of execution of the other of the job steps when none of the host computers is available for execution or while the other of the job steps of said job is in execution on the available host computer and said job step execution command does not designate parallel execution; and means for adding information regarding the condition of the executed job step and information indicative of a waiting state of termination of execution of the other of the job steps to the information storage means.

7. A job step parallel execution control system as set forth in claim 5, which further comprises commanding means for commanding execution of the one of the job steps for an other of the host computers when the arbitrarily selected host computer designated by said execution command or the specific host computer designated by said execution command is determined by a one of the host computers executing the job to be other than said one of the host computers; and execution command receiving means provided in the host computer other than said one of the host computers executing said job for receiving said job step execution command from said commanding means.

8. A job step parallel execution control system as set forth in claim 5, wherein said job step execution commanding means comprises:

means for judging whether the other of the job steps in the job is in execution or not by referring to the information regarding condition of the job and the plurality of job steps stored in said information storage means; and means for judging whether the job step execution command designates parallel execution for the one of the job steps when the other of the job steps is in execution.

9. A job step parallel execution control system for a job control language of a computer system including a plurality of host computers, comprising:

information storage means for storing information regarding a condition of a job and a plurality of job steps in execution;

job controlling means for describing a content of an execution control command of one of the job steps and execution order of the job steps by a job control language, the job control language including a job control statement having a job step execution command designating whether (1) the job step is to be executed by a specific host computer or by an arbitrarily selected host computer, and (2) whether said job is to be continued, said job is to be forcedly terminated or said job is to be terminated after termination of execution of a job step other than the one of the job steps in said job upon abnormal termination of the one of the job steps;

job control statement translating means for sequentially decoding said job control statement of a job to be executed;

job step execution commanding means for commanding execution of said job steps on the arbitrarily selected host computer designated by the execution command or on the host computer designated by said execution command upon detecting a job step execution command contained in said job control statement through decoding by said job control statement translating means;

job step executing means responsive to said job step execution command for initiating and executing a program designated by said job step execution command as an executed job step;

job step termination receiving means for receiving information indicative of a termination state of the one of the job steps upon termination of the one of the job steps which is executed;

termination processing means for making judgement for termination of the job step received by said job step termination receiving means and terminating said job according to the content of the job step execution command in said job control statement when the job step termination state is abnormal termination;

forced termination commanding means for commanding forced termination of the other of the job steps in execution when the job step execution command designates forced termination of the job; and forced termination means for forcedly terminating the other of the job steps in execution when the job step execution command designates forced termination for the other of the job steps.

10. A job step parallel execution control system as set forth in claim 9, which further comprises:

termination notifying means included in an other of the host computers other than a one of the host computers commanding execution of said job step for transmitting a notice notifying the one of the host computers of a termination and a terminating condition of the job step received by said job step termination receiving means; and receiving means included in the one of the host computers commanding the execution of the job step for receiving the notice from said termination notifying means.

11. A job step parallel execution control system as set forth in claim 9, which further comprises:

other host termination commanding means included in a one of the host computers commanding execution of the job step for commanding forced termination of said job step for an other of the host computers which is commanded to execute the job step by said job step execution commanding means, when the job step for which the forced termination is commanded by said forced termination commanding means is in execution by the other of the host computers; and receiving means included in said other of the host computers for receiving a forced termination command from said forced termination commanding means.

12. A job step parallel execution control system for a job control language of a computer system including a plurality of host computers, comprising:

information storage means for storing information regarding a condition of a job and a plurality of job steps in execution;

job controlling means for describing a content of an execution control command of one of the job steps and execution order of the job steps by a job control language, the job control language including a job control statement having a job step execution command designating whether (1) the job step is to be executed by a specific host computer or by an arbitrarily selected host computer, (2) whether a parallel execution during execution of a job step other than the one of the job steps in the same job is permitted or not upon commanding execution of the one of the job steps; and (3) whether said job is to be continued, said job is to be forcedly terminated or said job is to be terminated after termination of execution of the other of the job steps in said job upon abnormal termination of the one of the job steps;

job control statement translating means for sequentially decoding said job control statement of a job to be executed;

job step execution commanding means for commanding execution of said job steps on the arbitrarily selected host computer designated by the execution command or on the host computer designated by said execution command upon detecting a job step execution command contained in said job control statement through decoding by said job control statement translating means when no job step in execution in the same job is detected from said information stored in said information storage means or when the job step execution command designates parallel execution;

job step executing means responsive to said job step execution command for initiating and executing a program designated by said job step execution command as an executed job step;

job step termination receiving means for receiving information indicative of a termination state of the one of the job steps upon termination of the one of the job steps which is executed;

termination processing means for making judgement for termination of the job step received by said job step termination receiving means and terminating said job according to the content of the job step execution command in said job control statement when the job step termination state is abnormal termination;

forced termination commanding means for commanding forced termination of the other of the job steps in execution when the job step execution command designates forced termination of the job; and forced termination means for forcedly terminating the other of the job steps in execution when the job step execution command designates forced termination for the other of the job steps.

13. A job step parallel execution control system as set forth in claim 12, which further comprises:

termination notifying means included in an other of the host computers other than a one of the host computers commanding execution of said job step for transmitting a notice notifying the one of the host computers of a termination and a terminating condition of the job step received by said job step termination receiving means; and receiving means included in the one of the host computers commanding the execution of the job step for receiving the notice from said termination notifying means.

14. A job step parallel execution control system as set forth in claim 12, which further comprises:

other host termination commanding means included in a one of the host computers commanding execution of the job step for commanding forced termination of said job step for an other of the host computers which is commanded to execute the job step by said job step execution commanding means, when the job step for which the forced termination is commanded by said forced termination commanding means is in execution by the other of the host computers; and receiving means included in said other of the host computers for receiving a forced termination command from said forced termination commanding means.

15. A job step parallel execution control system as set forth in claim 12, wherein said job step executing means comprises:

means for judging whether the host computer available for execution of said job step with reference to the information of the condition of the job and one of the job steps stored in said information storage means and determining one of the host computers as the specific host computer for executing the one of the job steps, when said job step execution command designates execution by the arbitrarily selected host computer;

means for judging whether the specific host computer is available for execution of the one of the job steps with reference to the information of the condition of the job and the one of the job steps stored in said information storage means when said job step execution command designates execution by the specific host computer;

means for waiting for termination of execution of the other of the job steps when none of the host computers is available for execution or while the other of the job steps of said job is in execution on the available host computer and said job step execution command does not designate parallel execution; and means for adding information regarding the condition of the executed job step and information indicative of a waiting state of termination of execution of the other of the job steps to the information storage means.

16. A job step parallel execution control system as set forth in claim 12, which further comprises commanding means for commanding execution of the one of the job steps for an other of the host computers when the arbitrarily selected host computer designated by said execution command or the specific host computer designated by said execution command is determined by a one of the host computers executing the job to be other than said one of the host computers; and execution command receiving means provided in the host computer other than said one of the host computers executing said job for receiving said job step execution command from said commanding means.

17. A job step parallel execution control system as set forth in claim 12, wherein said job step commanding means comprises:

means for judging whether the other of the job steps in the job is in execution or not by referring to the information regarding condition of the job and the plurality of job steps stored in said information storage means; and means for judging whether the job step execution command designates parallel execution for the one of the job steps when the other of the job steps is in execution.

* * * * *